(12) United States Patent
Hartenstine et al.

(10) Patent No.: US 9,533,530 B2
(45) Date of Patent: Jan. 3, 2017

(54) WHEEL ASSEMBLY FOR AN INFANT SUPPORT APPARATUS

(71) Applicant: Wonderland Nurserygoods Company Limited, Kwai Chung, N.T. (HK)

(72) Inventors: Curtis M. Hartenstine, Birdsboro, PA (US); Anthony V. Ruggiero, Downingtown, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 76 days.

(21) Appl. No.: 14/567,160

(22) Filed: Dec. 11, 2014

(65) Prior Publication Data

US 2015/0158334 A1 Jun. 11, 2015

Related U.S. Application Data

(60) Provisional application No. 61/963,678, filed on Dec. 11, 2013.

(51) Int. Cl.
*B60B 33/00* (2006.01)
*B60B 33/02* (2006.01)
(Continued)

(52) U.S. Cl.
CPC ............. *B60B 33/02* (2013.01); *B60B 33/006* (2013.01); *B60B 33/0078* (2013.01);
(Continued)

(58) Field of Classification Search
CPC .. B60B 33/0042; B60B 33/007; B60B 33/006; B60B 33/021; B60B 33/02; B60B 33/00; B62B 5/0457; B62B 5/0461; B62B 9/087; Y10T 16/18; Y10T 16/184; Y10T 16/195; A45C 5/145
(Continued)

(56) References Cited

U.S. PATENT DOCUMENTS 4,219,904 A * 9/1980 Melara ................ B60B 33/0028
16/44
4,290,166 A * 9/1981 Melara ................ B60B 33/0028
16/18 CG (Continued)

FOREIGN PATENT DOCUMENTS

CN 201777285 U 9/2010
CN 201660004 U 12/2010
(Continued)

OTHER PUBLICATIONS

Extended European search report from co-pending European application No. 14197421.2 dated May 11, 2015.
(Continued)

*Primary Examiner* — Roberta Delisle
(74) *Attorney, Agent, or Firm* — Baker & McKenzie LLP; David I. Roche (57) ABSTRACT

A wheel assembly for an infant support apparatus includes a wheel mount, a wheel pivotally connected with the wheel mount about a pivot axis, and a brake member assembled with the wheel for movement between a braking state and a release state, the brake member when in the release state being rotatable with the wheel relative to the wheel mount, and the brake member when in the braking state engaging with the wheel mount to block rotation of the wheel relative to the wheel mount.

31 Claims, 6 Drawing Sheets

(51) Int. Cl.
*B62B 9/08* (2006.01)
*B62B 5/04* (2006.01)

(52) U.S. Cl.
CPC ............ *B62B 9/087* (2013.01); *B62B 5/0457* (2013.01); *B62B 5/0461* (2013.01); *Y10T 16/195* (2015.01)

(58) Field of Classification Search
USPC ........................ 16/18 R, 31 R, 35 R, 42 T, 45
See application file for complete search history.

(56) References Cited

U.S. PATENT DOCUMENTS

| | | | | |
|---|---|---|---|---|
| 4,669,580 A * | 6/1987 | Neville | ............... | B60B 33/0042 16/35 R |
| 5,368,133 A * | 11/1994 | Yang | ................... | B60B 33/0042 16/35 R |
| 5,379,866 A | 1/1995 | Pearce et al. | | |
| 5,421,434 A | 6/1995 | Liao | | |
| 5,617,934 A * | 4/1997 | Yang | ................... | B60B 33/0042 16/35 R |
| 6,619,438 B1 * | 9/2003 | Yang | ................... | B60B 33/0021 188/1.12 |
| 7,516,512 B2 * | 4/2009 | Tsai | ................... | B60B 33/0042 16/18 R |
| 7,930,802 B2 * | 4/2011 | Tsai | ................... | B60B 33/0007 16/35 R |
| 7,937,805 B2 * | 5/2011 | Tsai | ................... | B60B 33/0021 16/35 D |
| 7,950,108 B2 * | 5/2011 | Yang et al. | ......... | B60B 33/0021 16/35 R |
| 8,316,999 B2 * | 11/2012 | Solinski et al. | ........ | B62B 9/087 188/1.12 |
| 9,150,236 B2 * | 10/2015 | Zhang | ..................... | B62B 9/082 |
| 9,174,662 B2 * | 11/2015 | Zhang | ..................... | B62B 9/082 |
| 2002/0189051 A1 * | 12/2002 | Holbrook | ............ | B60B 33/0002 16/18 R |
| 2003/0019075 A1 * | 1/2003 | Trevini | ............... | B60B 33/0021 16/35 R |
| 2010/0308553 A1 * | 12/2010 | Li | ........................... | B62B 9/087 280/47.38 |
| 2011/0061979 A1 * | 3/2011 | Tai | ............................. | B60T 1/04 188/22 |
| 2011/0083298 A1 * | 4/2011 | Yan | ..................... | B60B 33/0021 16/31 R |

FOREIGN PATENT DOCUMENTS

| | | |
|---|---|---|
| CN | 201580421 U | 3/2011 |
| DE | 10122372 A1 | 11/2002 |
| GB | 2211086 A | 6/1989 |

OTHER PUBLICATIONS

The Office Action of Jul. 4, 2016 of co-pending Chinese Patent Application No. 201410764579.9.

\* cited by examiner

WHEEL ASSEMBLY FOR AN INFANT SUPPORT APPARATUS

CROSS-REFERENCE TO RELATED APPLICATION(S)

This patent application claims priority to U.S. Provisional Patent Application No. 61/963,678 filed on Dec. 11, 2013, which is incorporated herein by reference.

BACKGROUND

1. Field of the Invention

The present invention relates to wheel assemblies for an infant support apparatus, and more particularly to wheel assemblies having a brake mechanism.

2. Description of the Related Art

Infant support apparatuses such as infant strollers or high chairs may typically have wheels to facilitate transportation. For safer use, the wheel usually needs to have a brake so that the infant support apparatus can be securely stopped in position. However, the construction of the brake devices are usually complex in construction, difficult to assemble, and may be subject to premature wear.

Therefore, there is a need for an improved wheel assembly that is easy to operate, and can address at least the foregoing issues.

SUMMARY

The present application describes a wheel assembly for an infant support apparatus. In one embodiment, the wheel assembly includes a wheel mount, a wheel pivotally connected with the wheel mount about a pivot axis, and a brake member assembled with the wheel for movement between a braking state and a release state, the brake member when in the release state being rotatable with the wheel relative to the wheel mount, and the brake member when in the braking state engaging with the wheel mount to block rotation of the wheel relative to the wheel mount.

In another embodiment, the wheel assembly includes a wheel mount, a wheel pivotally connected with the wheel mount about a pivot axis, a brake member assembled with the wheel for movement between a braking state that blocks rotation of the wheel relative to the wheel mount, and a release state allowing rotation of the wheel relative to the wheel mount, and an actuator member assembled with the wheel and operatively connected with the brake member, wherein the actuator member is movable relative to the wheel between a locking position corresponding to the braking state, and an unlocking position corresponding to the release state, the actuator member when in the unlocking position being rotatable with the wheel about the pivot axis.

DETAILED DESCRIPTION OF THE EMBODIMENTS

Figure 1:
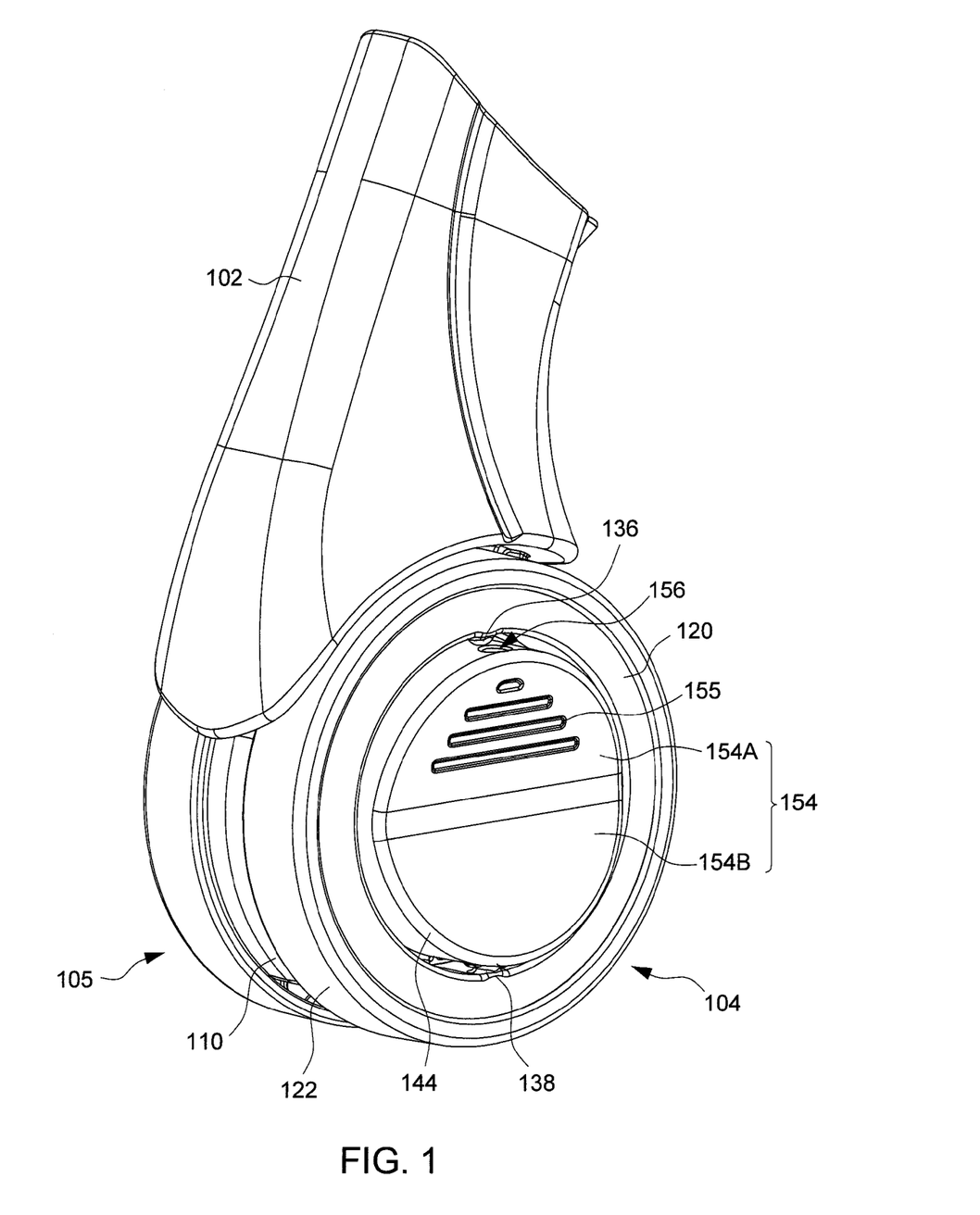
FIG. 1 is a perspective view illustrating an embodiment of a wheel assembly for an infant support apparatus.
Figure 2:
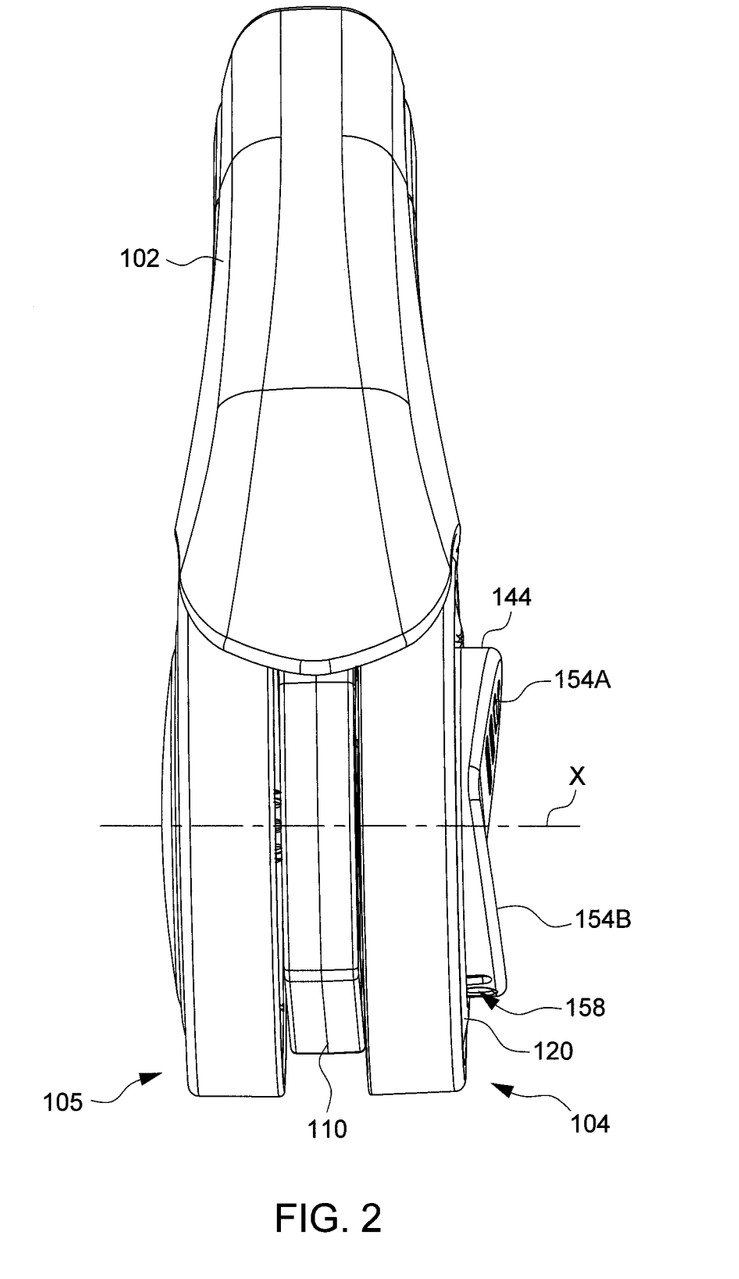
FIG. 2 is a front view of the wheel assembly shown in FIG. 1.
Figure 3:
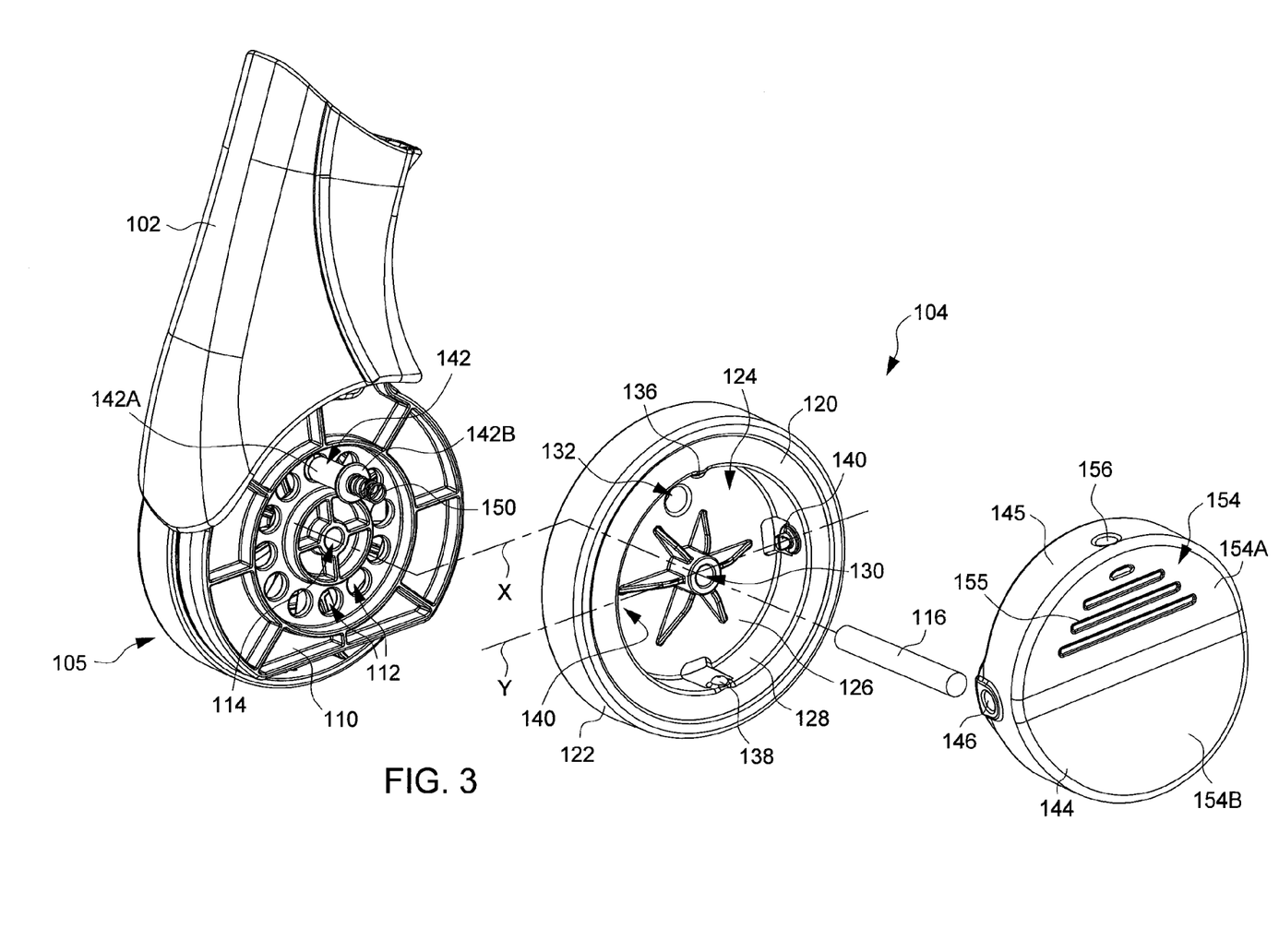
FIG. 3 is an exploded view of the wheel assembly shown in FIG. 1.
Figure 4:
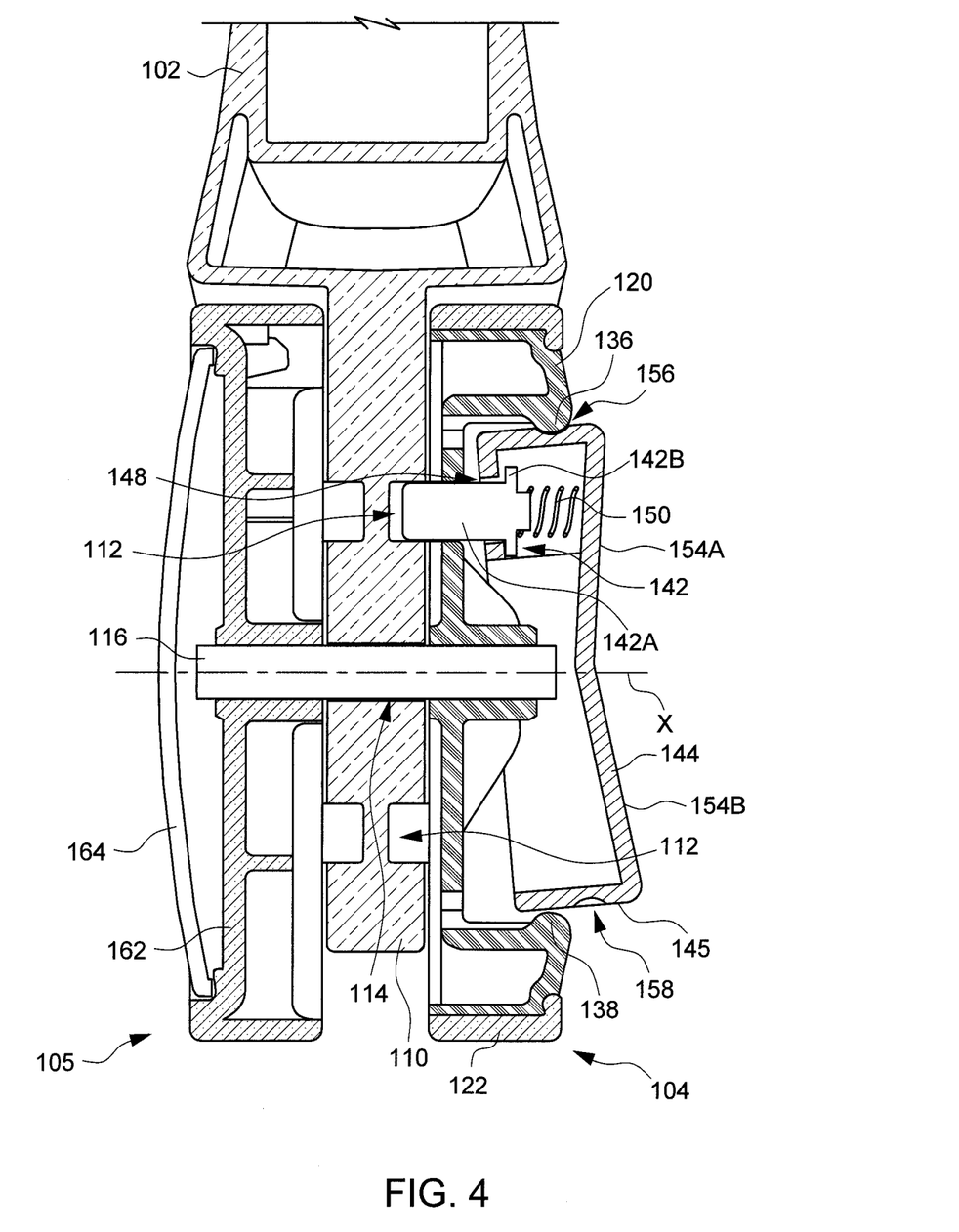
FIG. 4 is a cross-sectional view of the wheel assembly shown in FIG. 1 in a braking state.

FIG. 1 is a perspective view illustrating an embodiment of a wheel assembly 100 for an infant support apparatus, FIG. 2 is a front view of the wheel assembly 100, FIG. 3 is an exploded view of the wheel assembly 100, and FIG. 4 is a cross-sectional view of the wheel assembly 100. The wheel assembly 100 can include a rigid support frame 102, and one or more wheel 104 and 105 pivotally connected with the support frame 102 about a pivot axis X. In one embodiment, two wheels 104 and 105 can be respectively assembled at two opposite lateral sides of the support frame 102. However, alternate embodiments may only have one wheel 104 connected at one side of the support frame 102.

Referring to FIGS. 2-4, the support frame 102 can be affixed with a wheel mount 110 at two sides of which the wheels 104 and 105 are respectively assembled. One side of the wheel mount 110 can have a plurality of openings 112 distributed around a central hole 114 through which passes the pivot axis X.

The two wheels 104 and 105 can be respectively affixed with an axle 116 that is pivotally connected through the central hole 114. The wheel 104 can include a wheel frame 102, and a tire 122 affixed with an outer circumference of the wheel frame 120.

The wheel frame 120 can have a generally cylindrical shape, and can be made of a rigid material, e.g., plastics. The wheel frame 120 can have an inner cavity 124 at least partially delimited by a base surface 126, and a circumferential surface 128 of a generally cylindrical shape connected with the base surface 126. The base surface 126 can have a central bore 130 through which the axle 116 is assembled to define the pivot axis X, and a hole 132 located at a position eccentric from the central bore 130.

The wheel frame 120 can have two engaging portions 136 and 138 that are respectively disposed at two opposite sides with respect to the pivot axis X, e.g., at two diametrically opposite locations relative to the pivot axis X. In one embodiment, the two engaging portions 136 and 138 can be formed as protrusions projecting inward from the circumferential surface 128 of the inner cavity 124. In other embodiments, the two engaging portions 136 and 138 may also be arranged near the pivot axis X.

The circumferential surface 128 of the inner cavity 124 can further have two pivot pins 140 also protruding inward. In one embodiment, the two pivot pins 140 can be disposed on the circumferential surface 128 at two diametrically opposite locations relative to the pivot axis X, and can be angularly offset from the positions of the engaging portions 136 and 138 by about 90 degrees.

A brake member 142 can be arranged in the inner cavity 124, and can be assembled for sliding displacement through the hole 132 of the wheel frame 120 substantially parallel to the pivot axis X of the wheel 104. The brake member 142 can be formed with an elongated portion 142A having a flange 142B of an annular shape circumferentially protruding from the elongated portion 142A. The brake member 142 can slide through the hole 132 relative to wheel frame 120 between a braking state where the brake member 142 is engaged with one of the openings 112 of the wheel mount 110 to block rotation of the wheel 104, and a release state where the brake member 142 disengages from the openings 112 to allow rotation of the wheel 104 relative to the wheel mount 110. While it is in the release state, the brake member 142 can rotate with the wheel frame 120 about the pivot axis X relative to the wheel mount 110. Moreover, the brake member 142 is connected with an actuator member 144 that is operable to switch the brake member 142 between the braking state and the release state.

The actuator member 144 can be an integral part that is pivotally connected with the wheel frame 120 and is exposed for operation by a caregiver. In one embodiment, the actuator member 144 can be formed as a cap that substantially closes the inner cavity 124 and has a substantially circular peripheral edge 145 centered on the pivot axis X. The peripheral edge 145 can have two openings 146 at two opposite locations, and the two pivot pins 140 can respectively connect pivotally with the two openings 146 to define a pivot axis Y that is orthogonal to the pivot axis X. The actuator member 144 can be thereby pivotally connected with the wheel frame 120 at two locations diametrically opposite to each other relative to the pivot axis X. It is worth noting that the actuator member 144 is not limited to the aforementioned cylindrical shape, and any shape can be suitable in general.

Referring to FIGS. 3 and 4, the actuator member 144 can have an inner portion formed with a hole 148 located eccentric from the pivot axis X, and the brake member 142 can be slidably arranged through the hole 148. A spring 150 can be respectively connected with the brake member 142 and an inner sidewall of the actuator member 144. The spring 150 can bias the brake member 142 to cause the flange 142B thereof to abut against a region of the actuator member 144 around the hole 148 and the elongated portion 142A to protrude outside the hole 148. It will be appreciated that the spring 150 may take any form, such as a coiled spring, a U-shaped spring having two segments that can elastically deflect toward and away from each other, and the like.

Figure 5:
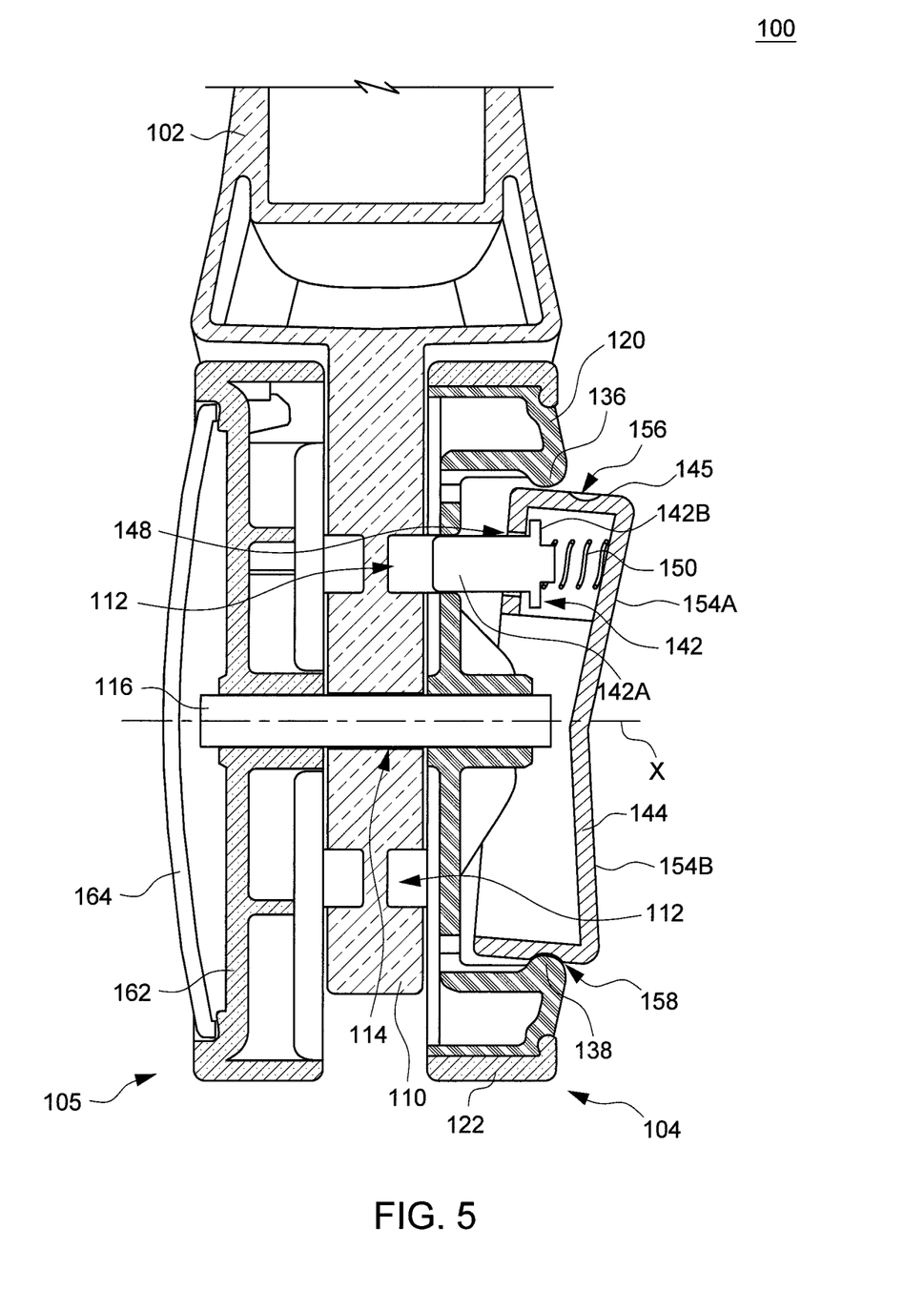
FIG. 5 is a schematic view of the wheel assembly shown in FIG. 1 in a release state.

The actuator member 144 as arranged above is rotatable about the pivot axis Y relative to the wheel frame 120 between a locking position corresponding to the braking state (as shown in FIG. 4) and an unlocking position corresponding to the release state (as shown in FIG. 5). When it is in the locking position, the actuator member 144 can be inclined a side so as to cause the brake member 142 to advance toward the wheel mount 110 and engage with one of the openings 112. When it is in the unlocking position, the actuator member 144 can be inclined in an opposite direction so as to disengage the brake member 142 from the wheel mount 110. The actuator member 144 when in the unlocking position can rotate with the wheel frame 120 about the pivot axis X relative to the wheel mount 110.

The actuator member 144 can have an outer surface 154 with a large surface area for facilitating a caregiver's pressure action to switch between the locking and unlocking position. As shown, the outer surface 154 may exemplary have two angled surface regions 154A and 154B that can visually distinguish two regions of the actuator member 144 to press for engaging and disengaging the brake member 142. For example, the surface region 154A of the actuator member 154 can be depressed to engage the brake member 142, and the surface region 154B of the actuator member 154 can be depressed to disengage the brake member 142. Other than providing two differently angled surface regions, the outer surface 154 may be provided with further visible markings to visually distinguish the two regions of the actuator member 144 to press for engaging and disengaging the brake member 142. For example, specific patterns 155 may be provided in the region of the actuator member 144 that is pressed for engaging the brake member 142. It will be understood that the outer surface 154 of the actuator member 144 is not limited to the aforementioned configurations, and any shapes may be applicable for the outer surface 154.

For holding the actuator member 144 in the locking and unlocking positions, the peripheral edge 145 of the actuator member 144 can further include two recesses 156 and 158 respectively associated with the two engaging portions 136 and 138. The engagement of the engaging portion 136 with the recess 156 can lock the actuator member 144 in the locking position and hold the brake member 142 in the braking state. On the other hand, the engagement of the engaging portion 138 with the recess 158 can lock the actuator member 144 in the unlocking position and hold the brake member 142 in the release state. It will be appreciated that the actuator member 144 can also be held in place by having the engaging portions 136 and 138 formed as recesses, and protrusions can substitute for the recesses 156 and 158 on the peripheral edge 145 of the actuator member 144.

Referring again to FIG. 4, the other wheel 105 can be assembled at a side of the wheel mount 110 opposite to that of the wheel 104. The wheel 105 can also include a wheel frame 162 that is affixed with the axle 116, so that both the wheels 104 and 105 can rotate in unison. A cover 164 can be arranged so as to substantially cover an outer side of the wheel frame 162. Since a brake mechanism is incorporated in the wheel 104, the wheel 105 may have no brake. In alternate embodiment, the wheel 105 may also include a brake, e.g., similar to that of the wheel 104 as described previously.

Exemplary operation of the brake member 142 and the actuator member 144 is described hereinafter with reference to FIGS. 4 and 5. Referring to FIG. 4, when it is in the locking position, the recess 156 of the actuator member 144 is engaged with the engaging portion 136 of the wheel frame 120 to keep the actuator member 144 in the locking position, whereas the recess 158 of the actuator member 144 is disengaged from the engaging portion 138 of the wheel frame 120. While the actuator member 144 is in the locking position, the biasing force applied by the spring 150 can push against the brake member 142 to cause its engaging with the wheel mount 110.

Referring to FIG. 5, for unlocking the wheels 104, the actuator member 144 can be pushed in rotation about the pivot axis Y to disengage the engaging portion 136 of the wheel frame 120 from the recess 156 and to drive the brake member 142 to slide parallel to the pivot axis X for disengaging from the wheel mount 110. The actuator member 144 can be rotated until the engaging portion 138 of the wheel frame 120 engage with the recess 158, which can hold the actuator member 144 in the unlocking position and the brake member 142 in the release state. While the brake member 142 is in the release state and the actuator member 144 in the unlocking position, the brake member 142 and the actuator member 144 connected thereto are rotatable in unison with the wheel 104 about the pivot axis X relative to the wheel mount 110.

For locking the wheels 104, the actuator member 144 can be pushed to rotate reversely about the pivot axis Y until the brake member 142 reaches the braking state and the recess 156 of the actuator member 144 is engaged with the engaging portion 136 of the wheel frame 120.

Figure 6:
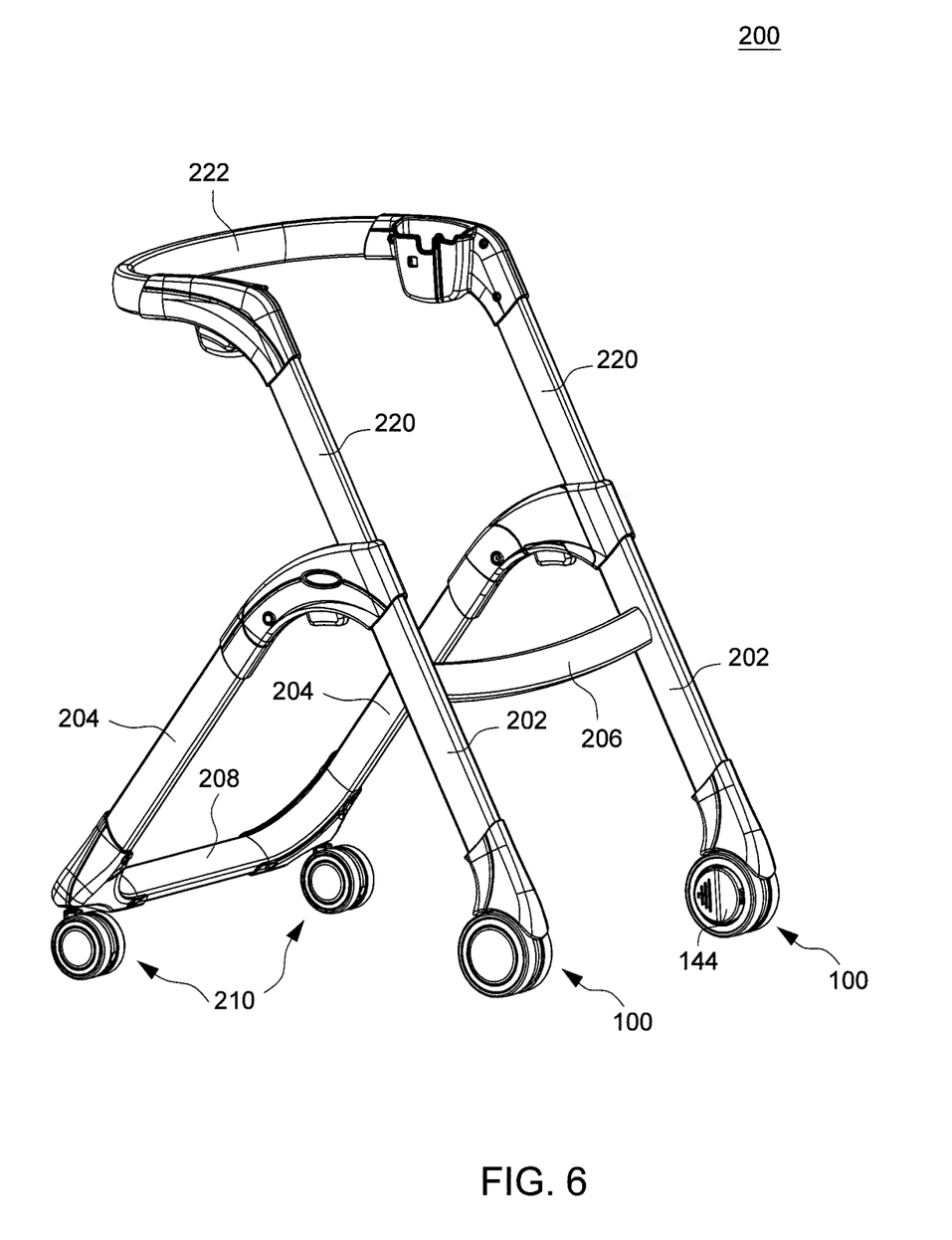
FIG. 6 is a schematic view illustrating an example of an infant support apparatus using the wheel assembly shown in FIG. 1.

FIG. 6 is a schematic view illustrating an example of an infant support apparatus 200 using the wheel assembly 100 previously described. The infant support apparatus 200 can typically receive a detachable seat (not shown), and can be configured as a high chair frame. The infant support apparatus 200 can have two front legs 202 connected with each other via a transversal bar 206, and two rear legs 204 connected with each other via another transversal bar 208. Each of the front legs 202 can be respectively provided with one wheel assembly 100 as described previously. The wheel assembly 100 can be exemplary disposed so that the actuator member 144 is at an inner side of the front legs 202. It will be appreciated that other embodiments may also place the wheel assembly 100 so that the actuator member 144 is at an outer side of the front legs 202.

Each of the rear leg 204 can be provided with another wheel assembly 210. The infant support apparatus 200 can further include support tubes 220 extending upward from the front legs 202 that are connected with each other via a bar linkage 222.

Advantages of the structures described herein include the ability to provide a wheel assembly that has a brake mechanism easy to operate. The wheel assembly can be suitable for use with any infant support apparatus including, without limitation, infant strollers, play yards, baby cribs, high chairs, etc.

Realizations of the wheel assemblies have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A wheel assembly for an infant support apparatus, comprising:
    a wheel mount;
    a wheel pivotally connected with the wheel mount about a pivot axis; and
    a brake member assembled with the wheel and movable relative to the wheel and the wheel mount between a braking state and a release state, the brake member when in the release state being rotatable with the wheel around the pivot axis relative to the wheel mount, and the brake member when in the braking state engaging with the wheel mount to block rotation of the wheel relative to the wheel mount.

2. The wheel assembly according to claim 1, wherein the brake member is movable substantially parallel to the pivot axis.

3. The wheel assembly according to claim 1, wherein the wheel mount includes a plurality of openings arranged around the pivot axis, and the brake member engages with any of the openings to block rotation of the wheel relative to the wheel mount.

4. The wheel assembly according to claim 1, wherein the wheel includes a wheel frame having an inner cavity in which the brake member is arranged, the inner cavity being at least partially delimited by a base surface provided with a hole, and the brake member is guided for sliding displacement through the hole to engage with the wheel mount.

5. The wheel assembly according to claim 4, further including an actuator member connected with the wheel frame, wherein the actuator member is operable to switch the brake member between the braking state and the release state, and the actuator member is rotatable with the wheel about the pivot axis when the brake member is in the release state.

6. The wheel assembly according to claim 5, wherein the actuator member is pivotally connected with the wheel frame.

7. The wheel assembly according to claim 6, wherein the actuator member is pivotally connected with the wheel frame at two locations diametrically opposite to each other relative to the pivot axis.

8. The wheel assembly according to claim 5, wherein the actuator member has a hole located eccentric from the pivot axis, the brake member being slidably disposed through the hole of the actuator member.

9. The wheel assembly according to claim 8, further including a spring connected with the brake member and the actuator member, the actuator member having a locking position corresponding to the braking state and an unlocking position corresponding to the release state, the spring biasing the brake member to engage with the wheel mount when the actuator member is in the locking position.

10. The wheel assembly according to claim 9, wherein the wheel frame has a first and a second engaging portion disposed at two opposite sides with respect to the pivot axis, the actuator member engages with the first engaging portion to hold the brake member in the braking state, and the actuator member engages with the second engaging portion to hold the brake member in the release state.

11. The wheel assembly according to claim 5, wherein the actuator member is formed as a cap that substantially closes the inner cavity and has a substantially circular periphery centered on the pivot axis.

12. The wheel assembly according to claim 5, wherein the actuator member has a first and a second region distinct from each other, the first region being depressed to switch to the braking state, and the second region being depressed to switch to the release state.

13. A wheel assembly for an infant support apparatus, comprising:
    a wheel mount;
    a wheel pivotally connected with the wheel mount about a pivot axis;
    a brake member assembled with the wheel and movable relative to the wheel and the wheel mount between a braking state that blocks rotation of the wheel relative to the wheel mount, and a release state allowing rotation of the wheel relative to the wheel mount, the brake member when in the release state being rotatable with the wheel around the pivot axis relative to the wheel mount; and
    an actuator member assembled with the wheel and operatively connected with the brake member, wherein the actuator member is movable relative to the wheel between a locking position corresponding to the braking state, and an unlocking position corresponding to the release state, the actuator member when in the unlocking position being rotatable with the wheel about the pivot axis.

14. The wheel assembly according to claim 13, wherein the actuator member is pivotally connected with the wheel.

15. The wheel assembly according to claim 13, wherein the actuator member is pivotally connected with the wheel at two locations diametrically opposite to each other relative to the pivot axis.

16. The wheel assembly according to claim 13, wherein the actuator member has a hole located eccentric from the pivot axis, the brake member being slidably disposed through the hole of the actuator member.

17. The wheel assembly according to claim 13, further including a spring connected with the brake member and the actuator member, the spring biasing the brake member to engage with the wheel mount when the actuator member is in the locking position.

18. The wheel assembly according to claim 13, wherein the wheel has a wheel frame provided with a first and a second engaging portion at two opposite sides with respect to the pivot axis, the actuator member engages with the first engaging portion to hold the brake member in the braking state, and the actuator member engages with the second engaging portion to hold the brake member in the release state.

19. The wheel assembly according to claim 13, wherein the wheel has a wheel frame in which is arranged the brake member, and the actuator member is formed as a cap that substantially closes the inner cavity and has a substantially circular periphery centered on the pivot axis.

20. The wheel assembly according to claim 13, wherein the actuator member is formed as an integral part having a first and a second region distinct from each other, the first region being depressed to switch to the braking state, and the second region being depressed to switch to the release state.

21. A wheel assembly for an infant support apparatus, comprising:
a wheel mount including a plurality of openings;
a wheel pivotally connected with the wheel mount about a pivot axis, the openings being arranged around the pivot axis; and
a brake member assembled with the wheel and movable relative to the wheel and the wheel mount between a braking state and a release state, the brake member when in the release state being rotatable with the wheel around the pivot axis relative to the wheel mount, and the brake member when in the braking state engaging with any of the openings on the wheel mount to block rotation of the wheel relative to the wheel mount.

22. The wheel assembly according to claim 21, wherein the brake member is movable substantially parallel to the pivot axis.

23. The wheel assembly according to claim 21, wherein the wheel includes a wheel frame having an inner cavity in which the brake member is arranged, the inner cavity being at least partially delimited by a base surface provided with a hole, and the brake member is guided for sliding displacement through the hole to engage with the wheel mount.

24. The wheel assembly according to claim 23, further including an actuator member connected with the wheel frame, wherein the actuator member is operable to switch the brake member between the braking state and the release state, and the actuator member is rotatable with the wheel about the pivot axis when the brake member is in the release state.

25. The wheel assembly according to claim 24, wherein the actuator member is pivotally connected with the wheel frame.

26. The wheel assembly according to claim 25, wherein the actuator member is pivotally connected with the wheel frame at two locations diametrically opposite to each other relative to the pivot axis.

27. The wheel assembly according to claim 24, wherein the actuator member has a hole located eccentric from the pivot axis, the brake member being slidably disposed through the hole of the actuator member.

28. The wheel assembly according to claim 27, further including a spring connected with the brake member and the actuator member, the actuator member having a locking position corresponding to the braking state and an unlocking position corresponding to the release state, the spring biasing the brake member to engage with the wheel mount when the actuator member is in the locking position.

29. The wheel assembly according to claim 28, wherein the wheel frame has a first and a second engaging portion disposed at two opposite sides with respect to the pivot axis, the actuator member engages with the first engaging portion to hold the brake member in the braking state, and the actuator member engages with the second engaging portion to hold the brake member in the release state.

30. The wheel assembly according to claim 24, wherein the actuator member is formed as a cap that substantially closes the inner cavity of the wheel frame and has a substantially circular periphery centered on the pivot axis.

31. The wheel assembly according to claim 24, wherein the actuator member has a first and a second region distinct from each other, the first region being depressed to switch to the braking state, and the second region being depressed to switch to the release state.

* * * * *